Feb. 27, 1934.                D. F. NEWMAN                 1,948,972
              COVER ARRANGEMENT FOR A PROJECTION BOOTH PORTHOLE
                            Filed May 13, 1931
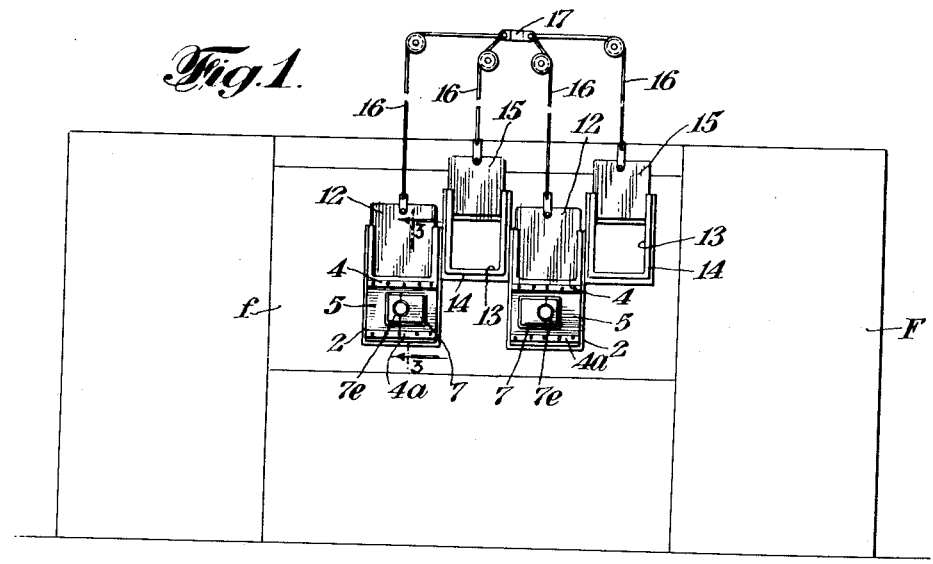
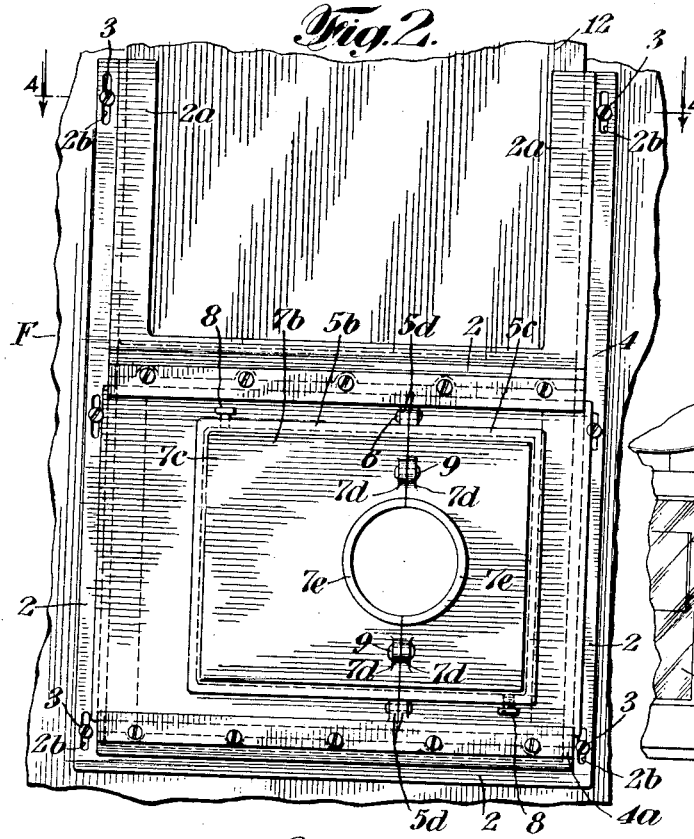
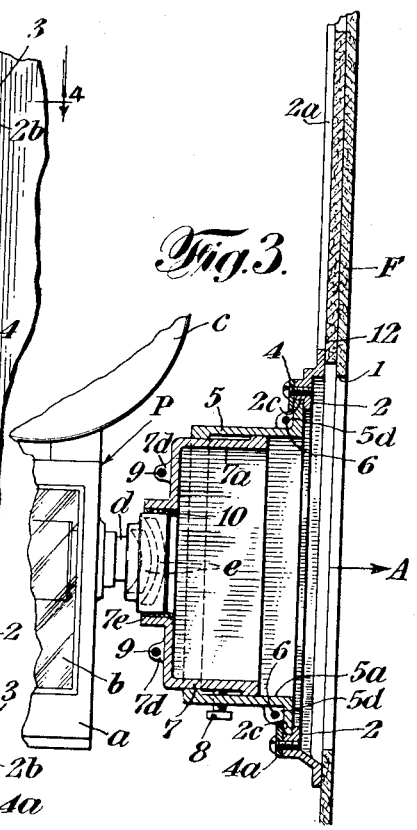
INVENTOR
David F. Newman
BY
Ward, Crosby & Neal
ATTORNEYS Patented Feb. 27, 1934

1,948,972

UNITED STATES PATENT OFFICE 1,948,972

COVER ARRANGEMENT FOR A PROJECTION BOOTH PORTHOLE

David F. Newman, Freeport, N. Y., assignor to Trans-Lux Daylight Picture Screen Corporation, New York, N. Y., a corporation of Delaware Application May 13, 1931. Serial No. 537,020

9 Claims. (Cl. 88—17)

My invention relates to projection booths generally and has more particular reference to a cover arrangement for the projection port hole of such a booth.

My invention, in a prominent phase thereof, relates to a cover arrangement forming a channel traversed by the projecting light beam, said cover arrangement serving to impede or substantially prevent the passage of sound or stray light through or along said channel.

My invention, in another prominent phase thereof, relates to a cover arrangement which comprises members adjustable with respect to each other for the useful purpose hereinafter specified.

Further objects, advantages and characteristics of my invention will become apparent from the following description taken in connection with the accompanying drawing.

My invention resides in the projection booth arrangement, projection booth port hole cover arrangement, adjustable multi-part structure, and other features of the character hereinafter described and claimed.

For an understanding of my invention and for an illustration of one of the many forms thereof, reference is to be had to the accompanying drawing, in which:

Figure 1 is an elevational view of the front wall of a projection booth as viewed from the interior of said booth;

Fig. 2 is an enlarged, elevational view of the interior surface of a limited area of the aforesaid front wall;

Fig. 3 is an enlarged, vertical, sectional view, partly in elevation, showing the aforesaid front wall together with cover parts carried thereby and is taken on the line 3—3 of Fig. 1 looking in the direction of the arrows; and Fig. 4 is a horizontal, sectional view, partly in plan, and is taken on the line 4—4 of Fig. 2 looking in the direction of the arrows.

Referring to the drawing, F represents the fireproof front wall of any suitable projection booth such, for example, as is utilizable in connection with the projection of motion pictures, the booth usually containing a plurality of projectors adapted for alternate, individual use, the light beam from each projector passing to any suitable screen. In Fig. 3, P indicates generally one of the aforesaid projectors and, as shown, this projector comprises a mechanism housing $a$ having a glass window $b$, one of the film magazines $c$ also being partly shown. Extending from the mechanism housing $a$ is an objective or projection lens barrel $d$, the projection lens, in the example shown although not necessarily, being a wide-angle lens combination of the character described in the pending Bowen applications Serial No. 316,403, filed November 1, 1928 and Serial No. 420,937, filed January 15, 1930, a wide-angle lens combination of this character including one or more negative lenses $e$. The projecting light beam, after leaving the aforesaid projection lens, passes in the general direction of the arrow A, Fig. 3, on its course to the display screen.

For purposes of explanation, it is assumed that the projection booth contains a pair of projectors so positioned that the respective projecting light beams alternately engage the display screen in the proper relation. Since the projectors are thus disposed in the projection booth, it follows that there should be an arrangement permitting the ready passage, in an efficient manner, of the respective projecting light beams to the screen and this arrangement should be of such character that the passage of stray light or sound waves along the light beam paths is greatly impeded or minimized. With the form of my invention herein shown, duplicate arrangements are provided, one for each projector. Because duplicate, a description of one such arrangement will suffice for the other.

Thus, in accordance with my invention, the booth wall F in alinement with each projector is provided with a passage or opening 1 of substantial area and of rectangular configuration in the example shown. Disposed as a frame about the opening 1 is a rectangular structure 2, the opposite vertical sides of which extend upwardly to form tracks 2$a$, 2$a$ utilizable as hereinafter described. Preferably, said opposite vertical sides and the tracks 2$a$, 2$a$ are provided with elongated slots 2$b$ through each of which extends a screw 3, the screws 3 being threaded into or otherwise suitably secured to the wall F. Obviously, when the screws 3 are slightly retracted, the structure 2 together with its tracks 2$a$, 2$a$ may be adjusted vertically to a limited degree.

As shown in Fig. 3, upper and lower horizontal plates 4, 4$a$ may be bolted or otherwise suitably secured to the structure 2 and the latter may be suitably flanged to provide upper and lower tracks 2$c$, 2$c$. Slidable, respectively, in the tracks last named are the upper and lower flanged sections of a frame structure 5 defining an opening 5$a$ alined with the opening of the structure 2. Obviously, the frame structure 5 may be moved or adjusted horizontally in either direction, the upper and lower flanged sections thereof freely sliding in the respective tracks 2c, 2c.

Preferably and as shown, the frame structure 5 is constituted by a pair of sections 5b, 5c suitably held in assembled relation. To this end, each of the sections 5b, 5c may be provided with mating flanges 5d, Fig. 2, through each set of which a readily releasable bolt or screw 6 extends.

Slidable in telescopic relation in the frame structure 5 is another frame structure 7 having an opening 7a alined with the aforesaid opening 5a. To prevent casual separation of the frame structure 7 from the frame structure 5 in a direction from right to left, Fig. 3, these two frame structures may be provided with flanged surfaces adapted to engage each other, Fig. 3. Further, for holding the frame structure 7 in predetermined position with respect to the frame structure 5, one or more set screws 8, or equivalent, may be utilized, said set screws 8 being threaded through the frame structure 5 and adapted to bind the respective adjacent surfaces of the frame structure 7.

Preferably, the frame structure 7, the same as the frame structure 5, is constituted by a pair of sections 7b, 7c which may be held in assembled relation by readily releasable bolts or screws 9 extending through mating ears 7d formed on said frame structure sections 7b, 7c.

Where the frame structures 5 and 7 are formed from pairs of sections as described above, it is highly desirable that an alined relation shall exist between the adjacent edges of each pair of sections. That is, as shown in Fig. 2, a plane vertical to the plane of the sheet of drawing paper includes that line defining adjacent edges of the pair of sections 7b, 7c and also that line defining adjacent edges of the pair of sections 5b, 5c.

As clearly appears from the drawing, the sections 7b, 7c of the frame structure 7 comprise laterally extending sections disposed in alinement and it is on these lateral sections that the aforesaid ears 7d are formed. Further, each of said lateral sections comprises a flanged semicircular section 7e, the sections 7e being so arranged as to form a circular passage which is in alinement with but substantially smaller than the aforesaid passages 1, 5a and 7a.

The passage formed by the flanged section 7e is adapted to receive the outer end of the projection lens barrel d as shown in Fig. 3. When this lens barrel is to be positioned as shown, the bolts 6 and 9 are released whereupon the frame structure sections 5b and 5c may be separated from each other to permit similar separating action of the frame structure sections 7b and 7c. As a result, the flanged sections 7e are spaced apart whereupon the outer end of the projection lens barrel d may be disposed therebetween, said lens barrel preferably carrying a washer 10 of felt or the like. The respective pairs of frame sections 7b, 7c and 5b, 5c may now be clamped in the relation shown to thereby positively secure the outer end of the lens barrel d between the curved sections 7e.

After the parts have been assembled as described above, the arrangement is as shown in Fig. 3 and the projector is in condition for operation. During projection, the projection light beam passes, in the direction of the arrow A, Fig. 3, from the projection lens and then through the various alined passages in succession, the light beam eventually impinging upon the projection screen. Obviously, with an arrangement such as shown in Fig. 3, stray light is largely or substantially prevented from passing outwardly from the projection booth through the passage 1. Moreover, and of importance, the cover arrangement comprising the members hereinbefore described largely prevents the passage to the exterior of the projection booth of sound such, for example, as is caused by operation of the projector. Heretofore in the art, the light passage from the projection booth has been closed by a glass plate or the like but such an arrangement is not desirable because the interposition of the glass plate in the light path decreases the efficiency of the optical system and does not prevent stray light leakage. With an arrangement of the character herein described, the advantages of prior art arrangements are realized without decrease in optical efficiency of the system.

With an arrangement of the character hereinbefore described, adjustment of the projector and its projection lens is more or less universal. Thus, should it be desirable to either lower or raise the projector P, the screws 3 may be slightly retracted whereupon the herein described cover arrangement may be readily moved upwardly or downwardly in correspondence with movement of the projector. Further, in the event that it should be desirable to move the projector sidewise or to impart similar movement to the projection lens alone, the arrangement is such that the frame structure 5 readily slides horizontally in the tracks 2c. Still further, in the event that the projector is moved either toward or from the screen or if the projection lens d alone is similarly moved during the focusing action, the arrangement is such that the frame structure 7 may be readily moved with the projection lens either inwardly or outwardly with respect to the frame structure 5.

A feature of my invention relates to the disposition of the flanges 7e to one side in a horizontal direction with respect to the center line of the lateral face of the frame structure 7. Ordinarily, the booth wall F is substantially parallel with the screen and, therefore, the longitudinal axis of the frame structures 2, 5 and 7 is substantially perpendicular to the screen. Where a pair of projectors are alternately used, the projectors are symmetrically disposed on opposite sides, respectively, of the screen center line, and therefore, the axis through each projection lens is obliquely related to the screen. Accordingly, an oblique relation obtains between the longitudinal axis of the aforesaid frame structures and the axis of the projecting light beam. If the axis of the projection lens coincides with said longitudinal axis of the frame structures, more of the light beam is at one side of said longitudinal axis than at the other side. This effect may be counteracted by shifting the axis of the projection lens (arranging the flanges 7e non-centrally as shown) so that the horizontal width of the cover arrangement may be kept at a minimum.

In Fig. 1, the front wall F of the projection booth comprises spaced side-by-side openings corresponding with the opening 1 of Fig. 3 and, around each opening, there is arranged a cover arrangement corresponding with the construction hereinbefore described, a projector P and the projection lens d therefore being associated with each cover arrangement.

For closing each opening 1 in the booth wall F, there is utilized a plate-like, fireproof member 12 disposed in any suitable manner preferably for vertical sliding movement. As herein shown, the member 12 for each cover arrangement is slidable in the tracks 2a, 2a thereof, the rectangular structure 2 being so fashioned as to readily permit this sliding action of said member 12.

At the side of each cover arrangement, the booth front wall F is formed with an observation opening 13. Around each of the openings 13, there is positioned a frame 14 forming tracks at its opposite vertical sides, each set of tracks slidably receiving a plate-like member 15 of fireproof material.

During normal projection operation, all of the plate-like members 12 and 15 should be retained in open position by some suitable arrangement adapted to be manually or automatically operated in case fire should develop in the booth whereby all of said members may be instantly moved to closed position. As indicative of an arrangement which may thus be utilized, I have shown each of said members 12 and 15 as having a flexible member 16 extending therefrom, all of said members 16 being connected to a link 17 readily fusible when subjected to suitable high temperature. The link 17 should be suitably located in the projection booth and, in addition, suitable manually operable means should be provided for lowering all of the members 12 and 15 in unison.

If desired, the structures hereinbefore described, i. e. the frames 2 and 14 together with the parts carried thereby and associated therewith may all be mounted on a panel f forming a separable part of the booth front wall F.

Although I have described and illustrated a particular cover arrangement, it shall be understood that my invention is not to be strictly limited thereto. Thus, under some circumstances, it may be desirable to provide a cover arrangement lacking some of the adjustable features herein disclosed. For example, it may be desirable to omit provision for the vertical adjustment as effected by the slots 2b and screws 3, or equivalent. Or, some other adjustable feature may be omitted. Further, there may be modification of the adjustable functions of some of the frame structures; for example, the frame structure 7, or equivalent, may be arranged for horizontal sidewise adjustment, the frame structure 5 being adapted to partake of movement toward and from the screen, etc.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a projection booth having an opening in a wall thereof for the passage of a projecting light beam emanating from a projector in said booth, and means forming a channel between the projection lens of said projector and said opening, said means comprising separate channel-forming members adjustable with respect to each other in a direction lateral with respect to the longitudinal axis of said projecting light beam.

2. In a projection booth having an opening in a wall thereof for the passage of a projecting light beam emanating from a projector in said booth, and means forming a channel between the projection lens of said projector and said opening, said means comprising channel-forming members adjustable with respect to each other, one of said channel-forming members being telescopically related to another of said members, and one of said channel forming members being adjustable with respect to the longitudinal axis of said projecting light beam.

3. In a projection booth having an opening in a wall thereof for the passage of a projecting light beam emanating from a projector in said booth, means forming a channel between the projection lens of said projector and said opening, said means comprising channel-forming members vertically and horizontally adjustable with respect to the axis of said projecting light beam.

4. The combination with a projection booth having an opening in a wall thereof for the passage of a projecting light beam, of means carried by said wall and forming a light beam channel interiorly of said booth and in alinement with said opening, said means comprising channel-forming members adjustable with respect to each other, one of said channel-forming members being adjustable laterally with respect to the axis of said projecting light beam.

5. The combination with a projection booth having an opening in a wall thereof for the passage of a projecting light beam, of a frame structure carried by said wall, a second frame structure carried by said first named frame structure, and a third frame structure carried by said second named frame structure, said frame structures being of channel-forming configuration and forming a channel between said opening and the projection lens of a projector in said booth, one of said frame structures being adjustable laterally with respect to the axis of said projecting light beam.

6. The combination with a projection booth having an opening in a wall thereof for the passage of a projecting light beam, of a frame structure carried by said wall, a second frame structure carried by said first named frame structure, and a third frame structure carried by said second named frame structure, one of said frame structures being vertically adjustable, another of said frame structures being horizontally adjustable, and another of said frame structures being adjustable toward and from a projector in said booth, said frame structures being of channel-forming configuration and forming a channel between the projection lens of said projector and said opening.

7. The combination with a projection booth having an opening in a wall thereof for the passage of a projecting light beam, a frame structure carried by said wall and vertically adjustable thereon, a second frame structure carried by said first named frame structure and horizontally adjustable thereon, and a third frame structure carried by said second named frame structure and adjustable thereon toward and from a projector in said booth, said frame structures being of channel-forming configuration and forming a channel between the projection lens of said projector and said opening.

8. The combination with a projection booth having an opening in a wall thereof for the passage of a projecting light beam, of means carried by said wall and forming a light beam channel interiorly of said booth and in alinement with said opening, said member comprising a channel-forming member adjustable toward and from said opening, said member having a lateral face formed with a light beam passage having a flanged extension therearound.

9. The combination with a projection booth having an opening in a wall thereof for the passage of a projecting light beam, of means carried by said wall and forming a light beam channel interiorly of said booth and in alinement with said opening, said member comprising a channel-forming member adjustable toward and from said opening, said member having a lateral face formed with a light beam passage disposed at one side of the center thereof and having a flanged extension therearound, said member being formed from a pair of sections releasably joined together along a line intersecting said opening.

DAVID F. NEWMAN.